2,866,799

METHOD FOR CONVERTING A 17-20,20-21 BIS-METHYLENEDIOXY OR A 17-20,20-21 BIS-SUBSTITUTED METHYLENEDIOXY STEROID OF THE PREGNANE SERIES TO A 17α,21-DIHYDROXY-20-KETO STEROID OF THE PREGNANE SERIES

Roger E. Beyler, Westfield, and Lewis H. Sarett, Princeton, N. J., assignors to Merck & Co., Inc., Rahway, N. J., a corporation of New Jersey No Drawing. Application January 2, 1957
Serial No. 632,026

12 Claims. (Cl. 260—397.45)

This invention relates to a process for making steroid compounds. More particularly, it relates to a process for elaborating a dihydroxyacetone side chain attached to a steroid nucleus. Still more particularly it is concerned with a method for converting a 17-20,20-21 bismethylenedioxy or a 17-20,20-21 bis-substituted methylenedioxy steroid of the pregnane series to a 17α,21-dihydroxy-20-keto steroid of the pregnane series.

As described and claimed in our copending patent applications Serial Nos. 632,009 and 632,010, filed January 2, 1957, the dihydroxyacetone moiety of a steroid compound may be inactivated or "blocked" by treatment of the steroid with a suitable aldehyde whereby a 17-20,20-21 bismethylenedioxy or 17-20,20-21 bis-substituted methylenedioxy steroid derivative is formed. Such derivatives are valuable since they permit processes such as a Claisen condensation or a Grignard reaction to be carried out on the steroid nucleus without undesirable involvement of the dihydroxyacetone side chain. This side chain is normally at carbon atom 17 of the nucleus and for this reason the discussion of our invention is directed to such steroids. It may, of course, be located at other positions of the nucleus such as at C–16 or C–17a of a D-homo steroid, and the process of our invention is equally applicable to such types of steroids.

It is a purpose of the present invention to provide a process for reforming the dihydroxyacetone side chain from the 17-20,20-21 bismethylenedioxy or 17-20,20-21 bis-substituted methylenedioxy steroid. It is a more specific object to provide a method of treating a 17-20,20-21 bismethylenedioxy (or bis-substituted methylenedioxy) steroid with acid whereby the bisdioxy group is removed and a 17α,21-dihydroxy-20-keto steroid obtained. A still more definite object is a method of treating a 17-20,20-21 bismethylenedioxy (or bis-substituted methylenedioxy) steroid of the pregnane series with acid, thus forming a 17α,21-dihydroxy-20-keto-pregnane. Further objects will be evident from the discussion of this process hereinbelow.

Our process may be pictured structurally as follows:

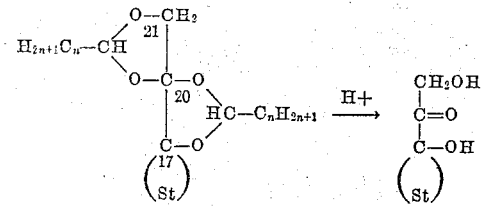

In the above equation $n$ is a whole integer having a value of 0 to 5 inclusive. The expression St is intended to mean the cyclopentanopolyhydrophenanthrene nucleus with the exception of carbon atom 17 which is separately shown. The steroid condensed ring nucleus may be substituted at one or several of the nuclear carbon atoms and may have one or several nuclear double bonds. The number, nature or location of such nuclear substituents or double bonds does not affect or interfere with the above process for forming the dihydroxyacetone side chain since the rest of the molecule does not participate in the reaction. As would be expected, any nuclear substituents subject to acid hydrolysis will be removed but this is not a fundamental molecular change and in most cases is incidental to obtainment of a particular type of steroid.

As will be seen from the partial structural formula above, the starting materials for our process are steroidal compounds having two hydrogen atoms or one hydrogen atom and one lower alkyl radical attached to each of two carbon atoms of the bis-dioxy moiety. Such products are made by treating a 17α,21-dihydroxy-20-keto steroid of the pregnane series with an aldehyde in the presence of a strong acid. The nature of these substituents depends, therefore, on the particular aldehyde with which the 17α,21-dihydroxy-20-keto moiety has been inactivated. Thus, we may use, and prefer to use, a 17-20,20-21 bismethylenedioxy steroid in which the value of $n$ in the formula above is 0, and which is obtained by reaction of the 17α,21-dihydroxy-20-ketone with formaldehyde. Alternatively, a 17-20,20-21 bisethylenedioxy ($n=1$), 17-20,20-21 bispropionaldioxy ($n=2$), 17-20,20-21 bisbutyraldioxy ($n=3$), 17-20,20-21 bisvaleraldioxy ($n=4$), or a 17-20,20-21 biscaproaldioxy ($n=5$) seroid compound of the pregnane series may be obtained with acetaldehyde, propionaldehyde, butyraldehyde, valeraldehyde or caproaldehyde, and employed satisfactorily as starting material for the process of this invention.

Typical examples of 17-20,20-21 bismethylenedioxy and 17,20,20-21 bis-substituted methylenedioxy steroids which are converted by our process to 17α,21-dihydroxy-20-keto steroids are:

17-20,20-21-bismethylenedioxy-pregnan-3-ol
17-4,20-21-bismethylenedioxy-4-pregnen-3-one
17-20,20-21-bismethylenedioxy-4-pregnene-3,11-dione
17 - 20,20 - 21 - bismethylenedioxy - 1,4 - pregnadiene-3,11-dione
17 - 20, 20 - 21 - bismethylenedioxy - 1,4 - pregnadiene-11β-ol-3-one
17 - 20,20 - 21 - bisethylidenedioxy - 1,4 - pregnadiene-3,11-dione
17-20-20-21-bisethylidenedioxy-4-pregnene-3,11-dione
17-20,20-21-bisethylidenedioxy-4-pregnene-11β-ol-3-one
17-20,20-21-bisbutyralidioxy-4-pregnene-3,11-dione
17 - 20,20 - 21 - bisbutyralidoxy - 9α - chloro - 4 - pregnene-11β-ol-3-one
17 - 20,20 - 21 - bisvaleraldioxy - 9α - bromo - 4 - pregnene-11β-ol-3-one
17 - 20,20 - 21 - bismethylenedioxy - 9α - fluoro - 1,4-pregnadiene-11β-ol-3-one
17 - 20,20 - 21 - bismethylenedioxy - 12α - fluoro - 1,4-pregnadiene-3,11-dione
17,20,20 - 21 - bispropionaldioxy - 4 - pregnene - 6 - ol-3,11-dione
17 - 20,20 - 21 - bismethylenedioxy - 6 - methyl - 1,4-pregnadiene-11β-ol-3-one
17 - 20, 20 - 21 - bismethylenedioxy - 12α - chloro - 4-pregnene-11β-ol-3-one
17 - 20,20 - 21 - bismethylenedioxy - 4,6 - pregnadiene-3,11-dione
17 - 20,20 - 21 - bismethylenedioxy - 9α - fluoro - 4 - pregnene-11β-ol-3-one
17 - 20,20 - 21 - bismethylenedioxy - 4 - pregnen - 9α,11β-diol-3-one
17-20,20-21-bismethylenedioxy-allopregnane-3,11-dione
17 - 20,20 - 21 - bismethylenedioxy - 19 - nor - 4 - pregnene-11β-ol-3-one 17-20,20-21-bismethylenedioxy-4-pregnen-6-ol-3-one 17 - 20,20 - 21 - bismethylenedioxy - 4,9(11) - pregnadien-3-one 17 - 20,20 - 21 - bismethylenedioxy - 9,11 - oxide - 4-pregnen-3-one 17 - 20,20 - 21 - bismethylenedioxy - 1,4 - pregnadiene-3,11-dione 17 - 20,20 - 21 - bismethylenedioxy - 4 - pregnene - 11β-ol-3-one 17,20,20-21-biscaproaldioxy-pregnane-3,11-dione 17 - 20,20 - 21 - bispropionaldioxy - 2 - methyl - 4 - pregnene-3,11-dione 17 - 20,20 - 21 - bisethylidenedioxy - 4 - pregnen - 9α,11β-diol-3-one In carrying out our process a solution or suspension of the 17-20,20-21 bismethylenedioxy or 17-20,20-21 bis-substituted methylenedioxy steroid of the pregnane series is treated with acid and preferably with a strong acid. We prefer to use perchloric acid, formic acid, acetic acid or mineral acids such as hydrochloric, hydrobromic, sulfuric or phosphoric acids, and the like. The reaction is preferably brought about in a one-phase solvent system. When an organic acid is employed to bring about regeneration of the dihydroxyacetone side chain, we find it suitable and convenient to use an excess of the acid as the solvent medium for the reaction. For example, in the conversion of the 17-20,20-21 bismethylenedioxy derivatives of cortisone and hydrocortisone to the parent compounds we have used acetic and formic acids as both solvent and acid. Alternatively, a lower aliphatic carboxylic acid, such as acetic or propionic acid, can serve as the solvent and a stronger acid employed to bring about the hydrolysis. Lower alkanols are another class of satisfactory solvents for the process. Likewise, a two-phase reaction system may be utilized, with the steroid dissolved in a suitable water-immiscible organic solvent such as chloroform, methylene chloride, benzene and the like. The organic phase and aqueous acidic phase are mixed by agitation to effect the reaction.

The reaction times and temperatures are not critical, and optimum conditions will vary with the particular steroid starting material and acidic reagent employed. Generally, we obtain optimum results at temperatures ranging from about 15° C. up to about 100° C., and at reaction times of about 30 minutes to about 50 hours. We prefer to carry out our process at about 25-75° C. for about three to ten hours.

With any particular 17-20,20-21 bismethylenedioxy (or bis-substituted methylenedioxy steroid) or acidic reagent the course of the reaction and the best operating conditions can be easily and readily determined by an assay with dianisole bisdiphenyltetrazolium chloride, otherwise known as the B. T. reagent. With this assay, a 17α,21-dihydroxy-20-keto steroid will give with the B. T. reagent and under the conditions described by Mader et al., Anal. Chem., 24, 666 (1952) a deep blue color. The intensity of the color, which is easily measurable quantitatively against a standard solution, is a measure of the amount of 17α,21-dihydroxy-20-keto steroid present since the 17-20,20-21 bisdioxy starting materials of our process do not give a positive test in the B. T. assay.

At the completion of our process, the formed 17α,21-dihydroxy-20-keto steroid is isolated by any of the methods known to those skilled in the steroid art. For example, the reaction solvent may be removed by concentration and the steroid extracted into a water-immiscible organic solvent. The solvent is then removed and the desired compound obtained in substantially pure form from the residue by chromatography on alumina. We prefer to form a C-21 ester of the steroid with a lower aliphatic carboxylic acid after removal of the reaction solvent but prior to any purification steps. These 21-esters, and particularly the acetates, are highly crystalline compounds and more readily purified than the free 21-alcohols.

The 17α,21-dihydroxy-20-keto moiety; either as such or esterified at positions 17 or 21, is an integral part of the several steroids which have pronounced cortisone-like activity. The new process described herein is a ready method of reforming this part of the molecule after it has been inactivated or "blocked" as a 17-20,20-21 bismethylenedioxy or 17-20,20-21 bis-substituted methylenedioxy derivative.

The following examples are given for purposes of illustration and not by way of limitation:

EXAMPLE 1

Cortisone acetate

To 100 mg. of 17-20,20-21-bismethylenedioxy-4-pregnene-3,11-dione is added 5 ml. of methanol and 5 ml. of 5 N sulfuric acid and the heterogeneous mixture refluxed on the steam bath for one hour (homogeneous after 45 minutes). The methanol is removed in vacuo and the resulting aqueous solution thoroughly extracted with ethyl acetate. The extract is washed with sodium bicarbonate, dried and concentrated to give 96 mg. of residue. This is dissolved in 0.3 ml. of pyridine and 0.3 ml. of acetic anhydride. The mixture is heated for ten minutes on the steam bath and poured into water. The resultant mixture is extracted several times with methylene chloride, the methylene chloride washed with dilute hydrochloric acid and sodium bicarbonate, dried over magnesium sulfate and evaporated. The residue is recrystallized from acetone to give cortisone acetate.

EXAMPLE 2

Hydrocortisone acetate

To 690 mg. of 17-20,20-21-bismethylenedioxy-4-pregnene-11β-ol-3-one is added 50 ml. of 50% acetic acid. This mixture is heated under nitrogen at 100° C. for 6⅓ hours. The reaction mixture is then concentrated under vacuum to dryness. The residue is dissolved in 2.0 ml. of pyridine and 1.8 ml. of acetic anhydride and kept at room temperature for 18 hours. After pouring into water the mixture is extracted several times with methylene chloride. The combined methylene chloride extracts are washed with 2.5 N hydrochloric acid and saturated aqueous sodium bicarbonate. Drying and evaporation of methylene chloride gives 742 mg. of crude hydrocortisone acetate. Chromatography on alumina yields substantially pure hydrocortisone acetate in the ether-chloroform (3 to 7, 2 to 8, and 1 to 9) effluents.

In the same manner, and using 540 mg. of 17-20,20-21-bismethylenedioxy-1,4-pregnadiene - 3,11 - dione as starting material, prednisone acetate is obtained.

EXAMPLE 3

Cortisone acetate 200 mg. of 17-20,20-21-bismethylenedioxy-4-pregnene-3,11-dione in 2.0 ml. of 98–100% formic acid is heated at 80° C. for 20 minutes. After cooling it is poured into about 10 ml. of water and extracted several times with methylene chloride. The combined solvent extracts are washed with saturated sodium bicarbonate solution, dried and concentrated to yield 203 mg. of semicrystalline product. Hydrolysis of this product with sodium methoxide in methanol, followed by acetylation of the hydrolysis product with acetic anhydride-pyridine yields cortisone acetate.

When a mixture of 150 mg. of 17-20,20-21-bismethylenedioxy-1,4-pregnadiene-11β-ol-3-one is heated at 75° C. for 30 minutes, and the mixture then worked up as described above, substantially pure prednisolone acetate is obtained.

EXAMPLE 4

Hydrocortisone

To 50 mg. of 17-20,20-21-bismethylenedioxy-4-pregnene-11β-ol-3-one in 2.0 ml. of glacial acetic acid is added 0.2 ml. of 60% perchloric acid. The mixture is kept at room temperature for 11 hours. It is poured into water and extracted several times with ethyl acetate. The combined ethyl acetate extracts are washed with saturated sodium bicarbonate and concentrated to give 46 mg. of crude hydrocortisone.

EXAMPLE 5

9α-fluoro-cortisone

To 100 mg. of 17-20,20-21-bismethylenedioxy-9α-fluoro-4-pregnene-3,11-dione in 2.5 ml. of glacial acetic acid is added 0.1 ml. of concentrated hydrochloric acid. After 42 hours at room temperature the reaction is worked up as described in Example 4 to give 9α-fluorocortisone.

EXAMPLE 6

Cortisone acetate

To 100 mg. of 17-20,20-21-bismethylenedioxy-4-pregnene-3,11-dione in 2.5 ml. glacial acetic acid is added 0.2 ml. of concentrated sulfuric acid. After 14 hours at room temperature the mixture is treated as in Example 4. A residue is obtained which on further purification yields substantially pure cortisone.

EXAMPLE 7

6-dehydrocortisone acetate

A mixture of 200 mg. of 17-20,20-21-bismethylenedioxy-4-6-pregnadiene-3,11-dione, 12 ml. of methanol and 12 ml. of 5 N sulfuric acid is refluxed for 90 minutes. The alcohol is removed by concentration in vacuo, and the residual solution extrated with three 10 ml.-portions of ethyl acetate. The organic extracts are combined, washed with dilute sodium bicarbonate and dried over magnesium sulfate. The solvent is removed in vacuo leaving a residue which is dissolved in a mixture of 1 ml. of pyridine and 1 ml. of acetic anhydride. After heating on the steam bath for 10 minutes, the mixture is poured into water, and the aqueous phase extracted with three 5 ml.-portions of chloroform. The chloroform solutions are washed with water, acid and base, and dried over magnesium sulfate. On evaporation of the solvent, and crystallization of the residue from acetone, 4-6-pregnadien-17α,21-diol-3,11,20-trione 21-acetate is obtained.

EXAMPLE 8

6-methyl prednisone acetate 180 mg. of 17-20,20-21-bismethylenedioxy-6-methy-1,4-pregnadiene-3,11-dione in 3 ml. of glacial acetic acid is treated with 0.5 ml. of concentrated sulfuric acid, and the reaction mixture held at 35° C. for 10 hours. The mixture is then poured into water and extracted with three small portions of methylene chloride. The organic extracts are combined, washed with dilute sodium bicarbonate and the solvent removed in vacuo. The residue is dissolved in pyridine-acetic anhydride as described in Example 2. The 6-methyl prednisone acetate thus obtained is isolated by the procedure set forth in Example 1.

EXAMPLE 9

4,9(11)-pregnadien-17α,21-diol-3,20-dione 21-acetate 510 mg. of 17-20,20-21 bisethylidenedioxy-4,9(11)-pregnadien-3-one is added to 45 ml. of 50% acetic acid and the resulting mixture heated on the steam bath under nitrogen for eight hours. The mixture at the end of this time is concentrated to dryness in vacuo, and the residue dissolved in 3.0 ml. of pyridine and 2.0 ml. of acetic anyhydride. This solution is held at 40° C. for 12 hours and then poured into 30 ml. of water.

The resulting aqueous solution is extracted with three 20 ml.-portions of chloroform, and the combined solvent extracts washed successively with 2 N hydrochloric acid, 5% sodium bicarbonate solution and water. The chloroform solution is dried and concentrated to dryness in vacuo. The residual 4,9(11)-pregnadien-17α,21-diol-3,20-dione 21-acetate may, if desired, be further purified by chromatographing on alumina.

EXAMPLE 10

Allopregnan-17α,21-diol-3,11,20-trione 21-acetate

Following the procedure of Example 9 with 500 mg. of 17-20,20-21-bispropionaldioxy-allopregnane-3,11-dione, there is obtained from the chloroform extract allopregnan-17α,21-diol-3,11,20-trione 21-acetate.

In the above examples, the starting materials may be prepared by treating a chloroform solution or suspension of a 17α,21-dihydroxy-20-keto steroid appropriately substituted or unsaturated in the nucleus with formaldehyde in the presence of hydrochloric acid to make the 17-20,20-21bismethylenedioxy compounds, or with a lower alkyl aldehyde in the presence of hydrochloric acid to make the 17-20,20-21 bis-substituted methylenedioxy compounds. The reaction is conveniently conducted at about 30° C. for five hours although for optimum yields the formation of bisdioxy compound is followed by means of the B. T. test referred to above. At the end of the reaction period, the two layers are separated, and the aqueous layer extracted with fresh chloroform. The chloroform solutions are combined, washed with 5% sodium bicarbonate and dried. The chloroform is then removed and the residual bisdioxy steroid further purified, if desired, by recrystallization or chromatographic methods well recognized in the art.

Although the above examples are given in order to teach specifically and to illustrate methods of carrying out our invention, it will be evident that ordinarily reactions or transformations are carried out in the nucleus of the 17-20,20-21 bisdioxy steroid before such compounds are treated by our process to re-form the dihydroxyacetone side chain.

What is claimed is:

1. The process which comprises treating a steroid of the pregnane series having at carbon atoms 17, 20 and 21 the structure

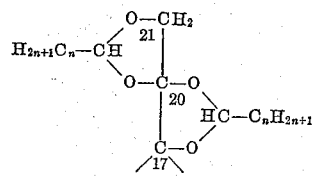

wherein $n$ is a whole integer having a value of 0 to 5 inclusive with an acid selected from the class consisting of perchloric, formic, acetic and mineral acids thereby forming a 17α,21-dihydroxy-20-keto steroid of the pregnane series.

2. The process of claim 1 wherein $n$ is 0.
3. The process of claim 1 wherein $n$ is 1.
4. The process of claim 1 wherein $n$ is 2.
5. The process of claim 1 wherein $n$ is 3.
6. The process which comprises treating a 17-20,20-21 bismethylenedioxy steroid of the pregnane series having at the 3-position a member of the class consisting of keto and hydroxy substituents with an acid selected from the class consisting of perchloric, formic, acetic and mineral acids thereby forming a 17α,21-dihydroxy-20-keto steroid of the pregnane series having at the 3-position a member of the class consisting of keto and hydroxy substituents.
7. The process which comprises treating 17-20,20-21 bismethylenedioxy-4-pregnene-3,11-dione with sulfuric acid thereby forming 4-pregnene-17α,21-diol-3,11,20-trione.
8. The process which comprises treating 17-20,20-21 bismethylenedioxy-4-pregnene-11β-ol-3-one with acetic acid thereby forming 4-pregnene-11β,17α,21-triol-3,20-dione.

9. The process which comprises treating 17-20,20-21 bismethylenedioxy-1,4-pregnadiene-3,11-dione with formic acid thereby forming prednisone.

10. The process which comprises treating 17-20,20-21 bismethylenedioxy-4-pregnene-11β-ol-3-one with perchloric acid thereby forming 4-pregnene-11β,17α,21-triol-3,20-dione.

11. The process which comprises treating 17-20,20-21 bismethylenedioxy-9α-fluoro-4-pregnene-3,11-dione with hydrochloric acid thereby forming 9α-fluorocortisone.

12. The process which comprises treating 17-20,20-21 bisethylidenedioxy-4,9(11)-pregnadien-3-one with acetic acid thereby forming 4,9(11)-pregnadien-17α,21-diol-3,20-dione.

No references cited.